United States Patent
Bartholomew

[11] 3,997,195
[45] Dec. 14, 1976

[54] NON-THREADED TUBING CONNECTOR
[75] Inventor: Donald D. Bartholomew, Marine City, Mich.
[73] Assignee: Merit Plastics, Inc., East Canton, Ohio
[22] Filed: June 5, 1975
[21] Appl. No.: 584,143
[52] U.S. Cl. .................. 285/81; 285/175; 285/331; 285/347; 285/382; 285/423; 285/DIG. 16
[51] Int. Cl.² .......................... F16L 35/00
[58] Field of Search ............ 285/322, 81, 323, 175, 285/33, 255, 370, 382, 242, DIG. 16, 243, 331, 347, 423

[56] References Cited
UNITED STATES PATENTS

| 1,051,805 | 1/1913 | Dunberg | 285/331 |
| 3,394,954 | 7/1968 | Surns | 285/347 X |
| 3,476,412 | 11/1969 | Demler | 285/382.2 X |
| 3,514,132 | 5/1970 | Peabody | 285/331 |
| 3,650,549 | 3/1972 | Pepper | 285/DIG. 16 |
| 3,754,781 | 8/1973 | Conroy | 285/322 |

FOREIGN PATENTS OR APPLICATIONS

| 1,310,713 | 10/1962 | France | 285/322 |
| 663,237 | 4/1964 | Italy | 285/323 |

Primary Examiner—Dave W. Arola
Attorney, Agent, or Firm—Harness, Dickey & Pierce

[57] ABSTRACT

A thin plastic tube or tube connector has at one end section a continuous or interrupted inclined plane means which collapses the plastic tube end section over a nipple or the end of another tube. The plastic tube end section is inserted over the nipple or other tube end to be sealed therewithin by the end wall engaging an O-ring within the end section and held in position by a locking ring drawn over the inclined plane means. The locking ring is drawn over the inclined plane surfaces to uniformly collapse the tube end section into engagement with the nipple or other tube end with a sealing force and with the locking sleeve in frictional locked engagement therewith.

9 Claims, 5 Drawing Figures

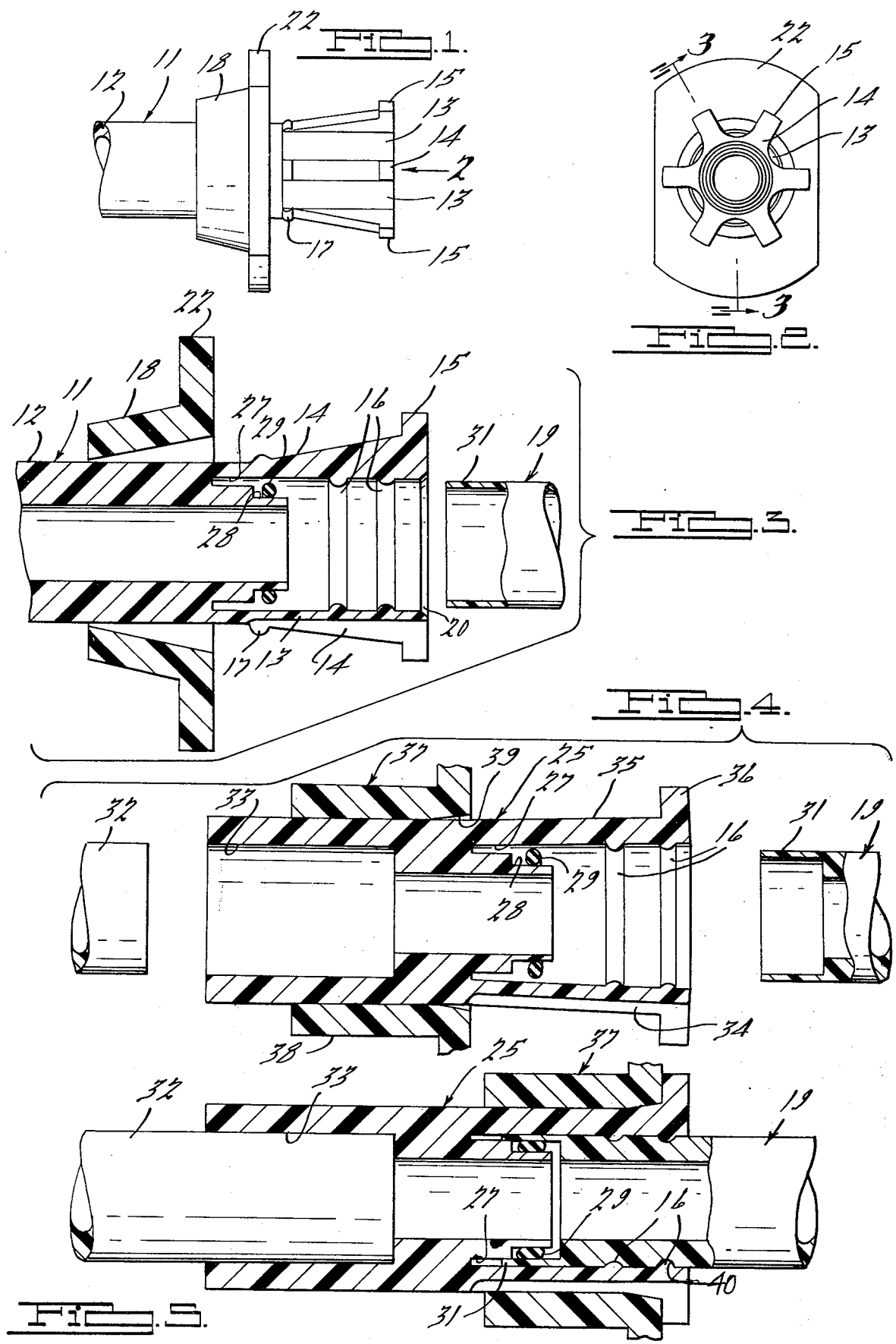

NON-THREADED TUBING CONNECTOR

BACKGROUND OF THE INVENTION

Reference may be had to the patent to W. R. Rinker, U.S. Pat. No. 3,348,863 to show the securing of a coupling to the end of a hose by wedge elements and elastic seals.

RELATED APPLICATION

Reference may be had to application Ser. No. 358,916, filed May 10, 1973 and assigned to the assignee of the present invention.

SUMMARY OF THE INVENTION

The invention pertains to a thin plastic tube to be employed as a cooling tubing for engines, liquid and gaseous pressure, vacuum tubes and the like which is made from a durable plastic material such as nylon or other high temperature resistant plastics. Zytel 91 is a nylon made by DuPont which can be satisfactorily employed as well as one made by Allied Chemical-8250 Nylon. An elastomer by DuPont known as Hytrel 6355 or a polyvinylchloride could also be employed for the coolant tube. The tube may have a continuous uniform wall thickness or may be corrugated to permit a greater degree of flexibility thereto. The tube or tube connector has the end wall section reduced in thickness and provided with spaced inclined plane sections on the outside thereof. One or more annular beads may be provided on the inner surface of the end wall section and a stop bead may be provided on each of the inclined plane elements for preventing the reverse movement of the clamping sleeve which has an internal truncated conical surface which mates with the surface of the inclined plane elements when drawn thereover. When the end section is advanced over a nipple or other tube end which may be made of metal, plastic or the like, the movement of the locking sleeve over the inclined plane sections uniformly collapses the tube over the nipple or tube end and thereby forms a seal therewith. When the internal annular beads are employed on the thin wall end section, the section can expand to permit the insertion of the end section over the nipple or other tube end. The inclination of the plane is small and develops very little force for reversely moving the sleeve therefrom. The stop beads when employed on the spaced inclined plane sections prevents the retractive movement of the locking sleeve on the inclined plane elements.

The tube end section or the connector has an annular slot provided within the plastic wall beyond a shouldered portion about which an O-ring is positioned. The end of the nipple or other tube end has the wall reduced so as to be capable of entering the annular slot and to compress the O-ring in the shouldered portion to provide a positive internal seal between the tube end or connector and the end of the nipple or other tube. This provides a double seal to the tube end or connector and the nipple or other tube both internally and externally.

BRIEF DESCRIPTION OF THE DRAWING

FIG. 1 is a view in elevation of a plastic tube and clamping sleeve in unlocked relation embodying features of the present invention;

FIG. 2 is an end view of the structure illustrated in FIG. 1, as viewed from the end 2 thereof;

FIG. 3 is an enlarged sectional view of the structure illustrated in FIG. 2, taken on the line 3—3 thereof;

FIG. 4 is an exploded view of structure, similar to that illustrated in FIG. 3, showing another form of the invention, and FIG. 5 is a view of the structure illustrated in FIG. 4, with the parts joined together.

DESCRIPTION OF THE PREFERRED EMBODIMENTS

Referring to FIGS. 1 to 3 wherein a coolant tube 11 is of uniform cross section having a wall 12 made of a plastic material such as one of those above mentioned. The end wall section 13 is reduced in thickness and provided with a plurality of spaced outwardly extending inclined plane sections 14 having a stop projection 15 on the outer end. One or more annular beads 16 are provided on the inside of the thin end wall section 13. The inner ends of the inclined plane sections 14 may have a locking bead or protrusion 17 provided thereon for securing a clamping sleeve 18 on the sections 14. A tube or nipple 19 which is made of metal, plastic or the like has the thin end wall section 31 received by the tube 11 which is inserted thereover, the tube 11 having a chamfer 20 on the end. If the annular beads 16 are present, the thin tube section 13 can expand to permit the beads to pass over the tube or nipple 19. When the end wall section 13 and nipple 19 are in telescoped relation, the locking sleeve 18 is advanced over the inclined plane sections 14 which progressively collapses the end wall section 13 substantailly uniformly over the tube or nipple 19. The slope of the inclined plane sections 14 and that of the internal truncated conical surface 21 of the locking sleeve 18 are of such low degree that the clamping sleeve will remain fixed on the surface of the elements 14 and develop insufficient force to overcome the frictional forces between the elements when forceably engaged in the locked position. The clamping sleeve 18 is normally constructed so as to be more rigid than the material of the collapsing end wall section 13. This results in a small amount of deformation of the inclined plane sections, which also serves to lock the sleeve in place. To assure the retention of the clamping sleeve 18 in locked position, or prevent travel of the sleeve past the end of the inclined plane one or more beads or protrusions 17 are provided at the lower or upper ends of the inclined plane sections 14 to lock the sleeve 18 thereon when the end passes thereover. A tool may be employed to engage a flange section 22 on the sleeve 18 and the stop sections 15 on the sections 14 for drawing the sleeve thereover. Various plastics, as pointed out hereinabove, may be employed for the tube 11 and clamping sleeve 18 to produce the coolant tube which is durable, which withstands high temperature and which is low in cost.

The above disclosure is from the subject matter of the above mentioned copending application and provides an external seal between the end wall section 13 and the nipple or tube 19. An internal seal between the tube 12 or the tube connector 25 is also provided by the structure of the present invention. In FIG. 3, the tube wall 12 has substantial thickness about a central passageway 26. A thin annular slot 27 is provided about the end of the passageway extending inwardly from a wider slot 28 about the wall of which an O-ring 29 is stretched. The nipple or tube 19, hereinafter referred to as a tube end, has its forward end 31 of thin construction so as to be received within the slot 27 when the tube end is advanced into the end wall section 13.

When so advanced, the inner wall of the forward end 31 compresses the O-ring 29 and forms an internal seal therewith. After the internal seal is formed, the locking sleeve 18 is advanced over the inclined plane sections 14 to form the additional outer seal.

The same double seal is provided by the structure illustrated in FIGS. 4 and 5. A tube connector 25 is employed to be permanently connected to the end of a tube 32 which fits snugly within a cylindrical recess 33. The tube 32 is retained within the recess 33 by an adhesive or by being heat staked or by any other means for joining plastic material together known in the art. The opposite end of the connector is similar to that illustrated in FIGS. 1 to 3. A slot 27 is provided in the material of the connector in continuation of a wider slot 28 about the wall of which an O-ring 29 is stretched. It will be noted that spaced thin inner walls 34 are provided about the outer end of the connector 25, the same as in FIG. 3, between which spaced sections 35 are supported with stop projections 36 on their outer ends. A clamping sleeve 37 is mounted on the tube connector 25 having a cylindrical portion 38 and a slightly tapered inner end portion 39. The wall of the spaced sections 35 is of substantially even thickness and made of a plastic material which readily flows under pressure. Beads 16 are provided on the inner face of the connector in position to engage the annular recesses 40 in the outer wall of the tube end 19 after the forward end 31 has been inserted within the slot 27. After this occurs the clamping sleeve 37 is moved upwardly along the spaced sections 35 assisted by having the slight inner taper 39 at the outer end. This forces the material of the inner thin wall 34 into a sealed relation with the end 31 of the tube 19. This substantially compresses the material of the thin wall section 34 as well as the spaced sections 35 to produce an outer seal in combination with the internal seal provided by the O-ring 29. This relationship of securing the connector 25 to the end of the tube 32 and the end 31 of the tube 19 is clearly illustrated in the sectional view of FIG. 5.

I claim:

1. In a releasable connector for a conduit, a body of flexible material having a central section containing an axial passageway about which a narrow axially extending annular slot is provided said slot being defined by a bottom wall and radially spaced inner and outer wall portions integrally formed in said body, said inner wall portion having a reduced portion forming a shouldered portion on the outer end, said annular slot and said reduced shouldered portion being disposed within and completely surrounded by an extended portion of said body, an O-ring on said shouldered portion, the conduit having a mating passageway and a thin annular end wall which is extendable into said annular slot for compressing said O-ring and providing an inner seal for the conduit, and threadless means for releasably securing the conduit within said connector.

2. In a releasable connector for a conduit as recited in claim 1, wherein said connector has a continuous annular thin inner wall which supports outer spaced inclined plane sections, and said threadless means includes a locking sleeve movable over said inclined plane sections thereby moving said thin inner wall into contact with the conduit to form an external seal with the outer surface of said conduit.

3. In a releasable connector for a conduit as recited in claim 1, wherein the opposite end of the connector has a cylindrical aperture, and a cylindrical tube having an end snugly fitting in said cylindrical aperture and a passageway aligned with the axial passageway in said connector.

4. In a releasable connector for a conduit as recited in claim 3, wherein said tube is retained in said cylindrical aperture by suitable securing means.

5. In a releasable connector for a conduit as recited in claim 2, wherein said locking sleeve has an inclined slope and said inclined plane means slopes in the same degree as the inclined slope of said locking sleeve which when moved thereover is retained against a reverse movement which would release said conduit.

6. In a releasable connector for a conduit as recited in claim 5, wherein said inclined plane sections have an annular bead at the inner edge which blocks the reverse movement of the locking sleeve from the inclined plane sections.

7. In a releasable connector for a conduit as recited in claim 2, wherein the outer end of the connector has inclined plane means on the thin wall thereof which are substantially of uniform thickness from the inner to the outer ends, and a locking sleeve having a slightly inclined plane on the outer end which compacts and compresses the material of the inclined plane sections and the thin inner wall to force the material into intimate engagement with the outer surface of the conduit to form an outer seal therewith.

8. In a releasable connector for a conduit member, as recited in claim 4, wherein said suitable securing means is heat.

9. In a releasable connector for a conduit member, as recited in claim 8, wherein said suitable securing means is an adhesive.

* * * * *